March 24, 1931.　　　E. J. SVENSON　　　1,797,704
FEED MECHANISM FOR LATHES
Filed March 24, 1928　　　3 Sheets-Sheet 1

Inventor:
Ernest J. Svenson,
By Chindahl Parker Kaelber
Attys.

March 24, 1931. E. J. SVENSON 1,797,704
FEED MECHANISM FOR LATHES
Filed March 24, 1928 3 Sheets-Sheet 2
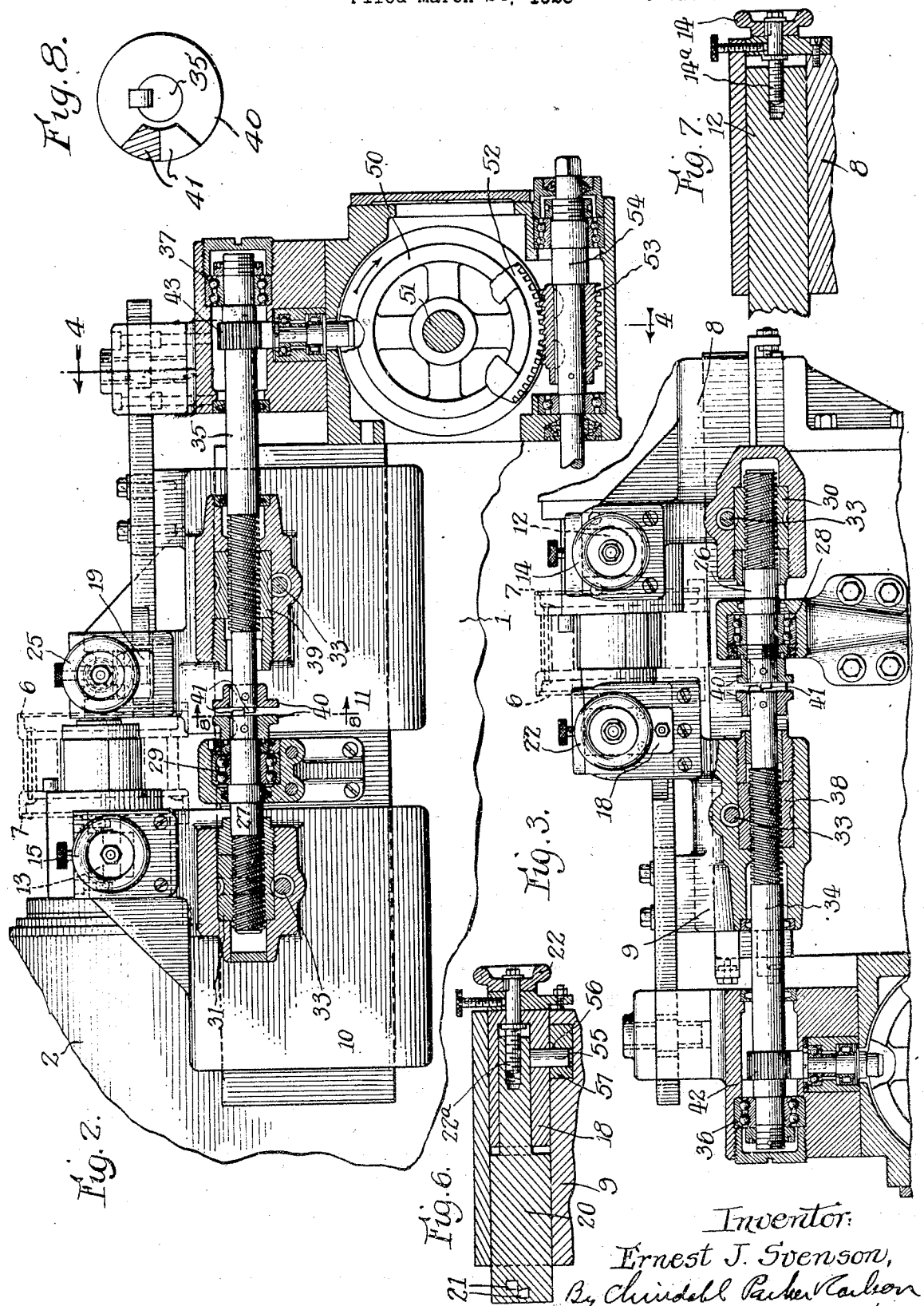
Inventor:
Ernest J. Svenson,
By Churchill Parker Carlson
Attys.

March 24, 1931.　　　　E. J. SVENSON　　　　1,797,704
FEED MECHANISM FOR LATHES
Filed March 24, 1928　　　3 Sheets-Sheet 3
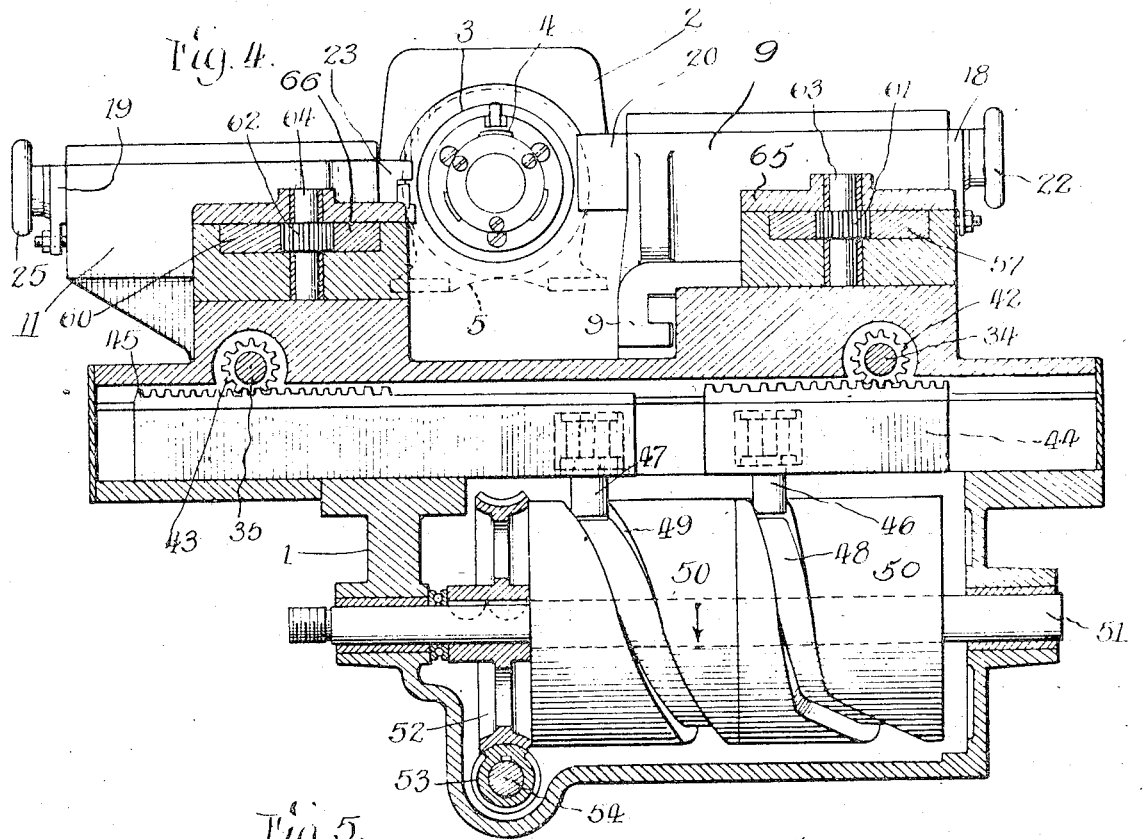
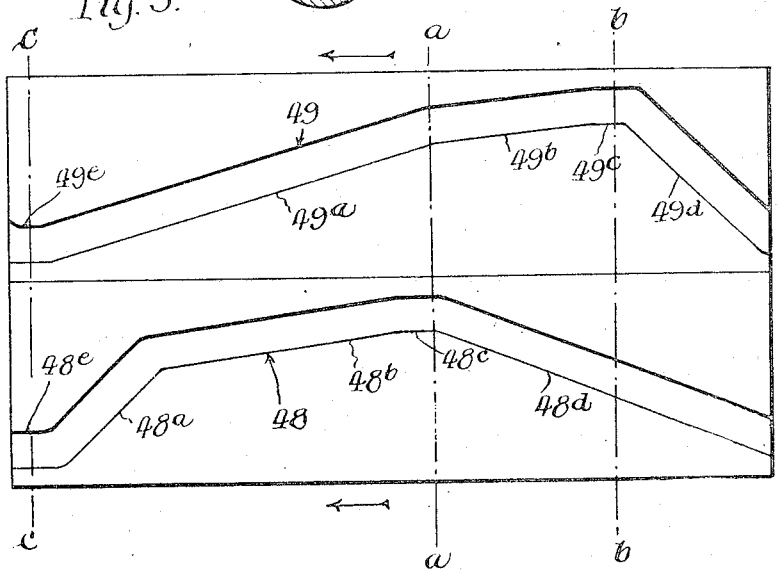
Inventor:
Ernest J. Svenson,
By Churchill Parker Carlson
Attys.

Patented Mar. 24, 1931

1,797,704

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

FEED MECHANISM FOR LATHES

Application filed March 24, 1928. Serial No. 264,534.

This invention relates generally to lathes and more particularly to mechanism for feeding the tool supports of a lathe.

It is the general object of the invention to provide a new and improved lathe, automatic in character and adapted to operate successively upon a plurality of duplicate work pieces.

It is another object to provide an automatic lathe of new and improved construction embodying front and rear tools supports together with mechanism for actuating said supports arranged to effect a feeding movement of the rear tools for a roughing operation and a feeding movement of the front tools for a finishing operation.

It is another object of the invention to provide a lathe having a plurality of tools supports with improved and simplified mechanism for actuating the tool supports.

It is another object to provide a lathe having a longitudinally movable carriage with a cross slide thereon together with novel means for actuating the cross slide.

It is another object of the invention to provide a lathe of improved construction especially adapted for simultaneously performing operations on the opposite ends of a work piece to avoid rechucking the piece.

It is another object to provide a lathe embodying roughening and finishing tools and which leaves equal amounts of metal for the finishing tool after each roughing operation.

It is another object to provide a lathe arranged to perform boring and facing operations upon the opposite ends of a work piece and to maintain the bores concentric and the faces parallel.

It is another object of the invention to provide an automatic lathe embodying means for rotatably supporting work pieces together with tool supports carrying tools arranged to operate on opposite ends of the work and mechanism for actuating said tool supports longitudinally towards and away from the work arranged also to withdraw certain of the tools laterally to permit removal of the work from the machine.

A further object is to provide an automatic lathe having a pair of rear carriages, a pair of front carriages, tool slides on said carriages and a simplified control and actuating mechanism for said parts.

Further objects and advantages of the invention will become apparent as the description proceeds.

In the drawings,

Fig. 2 is a fragmental front elevation thereof, partly in section.

Fig. 3 is a fragmental rear elevation, partly in section and approximately in the plane of line 4—4 of Fig. 1.

Fig. 4 is a section along line 4—4 of Fig. 2.

Fig. 5 is a diagrammatic view of the slots on the cam drum.

Figure 1:
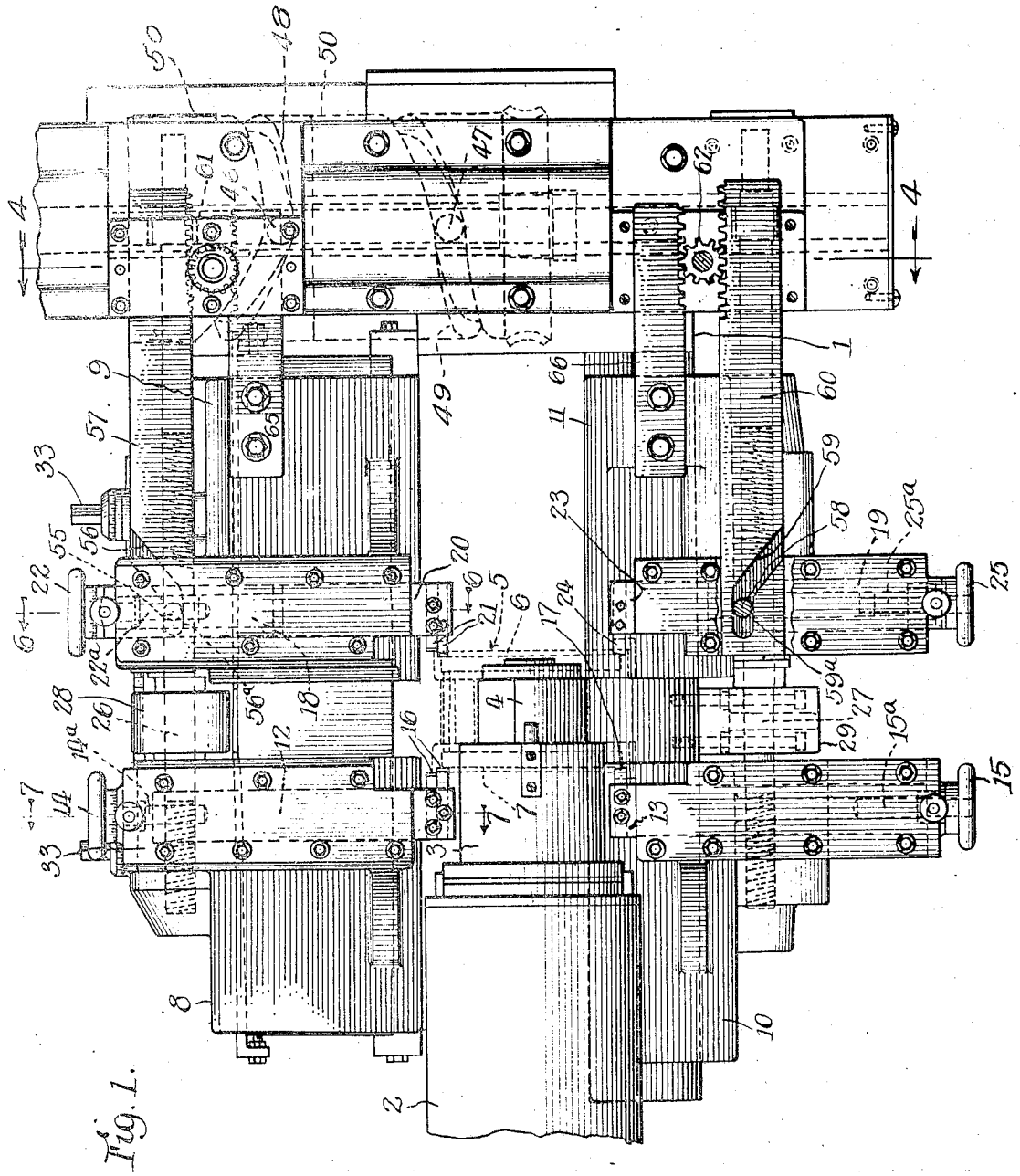
Fig. 1 is a fragmental plan view of a lathe embodying the invention in its preferred form.

Figs. 6 and 7 are fragmentary sections through the rear tool slides along the lines 6—6 and 7—7 respectively in Fig. 1.

Fig. 8 is an enlarged fragmentary section along the line 8—8 of Fig. 2 showing in detail one of the lost-motion connections.

While the invention is susceptible of embodiment in many different forms, there is shown in the drawings and will herein be described in detail one such embodiment, with the understanding that the present disclosure is to be considered as an exemplification of the principles of the invention and is not intended to limit the invention to the embodiment illustrated. The scope of the invention will be pointed out in the appended claims.

The invention in its preferred form is herein disclosed as embodied in a lathe having a base frame or bed 1 and a headstock 2. The headstock may be arranged in any desired manner to support a work holding device, such device being illustrated herein as comprising a mandrel 3, having a plurality of expanding jaws 4. This specific form of work support is especially adapted for mounting bored work pieces such as the motor stator 5 (indicated in dotted lines) which stator may be mounted on the expanding mandrel to have cutting operations performed on its end plates 6 and 7.

In the exemplary form selected for purposes of disclosure, the invention is shown in connection with a lathe equipped with tools for rough facing and boring the end plates of such a stator, and also with tools for finishing the end plates, and contemplates that the tools which operate on the tail end of the work will be withdrawn transversely of the lathe bed upon the completion of each operating cycle so as to permit the work piece to be removed from the mandrel. For this reason, the slides that carry the tools for operating on the tail end of the work are given a compound movement as hereinafter more fully described.

As illustrated in the drawings, the lathe is provided with a pair of longitudinally movable rear carriages 8 and 9 and a pair of longitudinally movable front carriages 10 and 11. The head end carriages 8 and 10 have similar tool slides 12, 13 thereon respectively which are adjustable transversely of the lathe by means including manually operable hand wheels 14 and 15. These hand wheels (as shown in Fig. 7 for the slide 12) may be secured to screws 14ª, 15ª which are rotatably mounted on the carriage and in threaded engagement with the slides. Roughing tools 16 are preferably mounted on the rear tool slide and a finishing tool 17 is mounted on the front tool slide, it being contemplated that these tools will be adjusted to the desired diameter during the set up of the machine and thereafter reciprocated longitudinally of the bed on the headstock side of the work during the operation of the machine.

Cross slides 18 and 19 are mounted for transverse movement on the tail carriages 9 and 11 respectively. The rear slide 18 is shown with a tool carrier 20 carrying roughing tools 21 supported on the cross slide for adjustment transversely of the bed by means including a hand wheel 22. Similarly a tool carrier 23 supports a finishing tool 24 and is adjustable on the front cross slide 19 transversely of the bed by means including a hand wheel 25. The hand wheels 22, 25 (as illustrated in Fig. 6 for the rear cross slide) are secured to screws 22ª, 25ª respectively which are rotatably mounted on the respective cross slides 18, 19 and are in threaded engagement with the tool carriers 20, 23. Means for actuating the cross slides 18, 19 will be described hereinafter.

It is contemplated that the rear carriages carrying the roughing tools will be moved so that the tools engage the work simultaneously and that the front carriages which support the finishing tools will likewise be moved longitudinally so that the finishing tools engage the opposite ends of the work simultaneously upon the completion of the roughing operation. Mechanism is therefore provided for advancing and returning the carriages simultaneously.

As disclosed herein this mechanism comprises feed screws 26 and 27 (Figs. 1, 2 and 3) for the head end carriages 8 and 10 respectively which screws are rotatably supported on the bed by means of bearings 28 and 29 and engage nuts 30 and 31 mounted on the respective carriages. The nuts are preferably adjustable rotatively on the carriages as by means of manually operated worms 33 which mesh with worm wheel teeth on the nuts. This provides for adjusting the normal positions of the carriages. The tail end carriages 9 and 11 are provided with feed screws 34 and 35 (Figs. 2 and 3) respectively rotatably mounted on the bed as by means of bearings 36 and 37. These feed screws engage nuts 38 and 39 secured adjustably to the respective carriages and extend through said nuts in axial alinement with the feed screws 26 and 27 to a position adjacent the rear ends thereof.

As shown in Fig. 2, the screws 27 and 35 that move the front carriages 10 and 11 are oppositely threaded, so as to cause said carriages to move in opposite directions. The same is true of the screws 26 and 34, as will be evident from Fig. 3.

Driving connections are provided between the rear feed screws 26 and 34 and between the front feed screws 27 and 35 in the form of lost-motion devices arranged to permit of a partial rotation of the tail end carriage screws 34, 35 prior to any movement of the head end carriage screws 26, 27 so that, as hereinafter more fully described, the tools carried on the tail end carriages may be advanced towards the work prior to any movement of the head end carriages, and may be given a retractive movement away from the work to move the tools thereon out of the way of the work when being removed, prior to the return movement of the head end carriages. In this way the tools 21, 24 are withdrawn outwardly from the positions shown in Fig. 1 so that the work 5 may be removed from the mandrel 3 by sliding the work longitudinally towards the tail end of the machine, the work then passing between the withdrawn tools. These lost-motion connections are herein illustrated as comprising coupling members or collars 40 (Figs. 2, 3 and 8) secured on the adjacent ends of the feed screws which collars have segmental lugs 41 thereon engageable to form driving connections between the adjacent shafts.

Means is preferably provided to actuate the tail end carriage feed screws 34, 35 in reverse directions and in a properly timed relation to each other so as to obtain the desired longitudinal movements of the tools. As illustrated herein pinions 42 and 43 (Figs. 2 to 4) are secured to the respective feed screws. These pinions are arranged to be operated by teeth on rack bars 44 and 45 respectively which are slidably mounted on the bed for movement transversely of the feed screws. The rack bars have rollers 46 and 47 rotatably mounted thereon which are arranged to engage cam slots 48 and 49 respectively on drums 50 mounted on a shaft 51 extending transversely of the bed 1 at its rear end. This shaft may be driven by any suitable means such as a worm wheel 52 secured thereon and a worm 53 mounted on a longitudinally extending shaft 54. It is contemplated that this shaft 54 may be driven by suitable means (not shown) and may be started and stopped simultaneously with the mandrel 3.

As mentioned hereinbefore, the tail end tool slides 18, 19 are given an automatic retractive movement for the purpose of withdrawing the tools from the work after the completion of the cutting operation to permit the ready removal of the finished work piece and the insertion of a new piece. In order to obtain these movements of the tool slides, the rear slide 18 is provided with a follower stud 55 (Figs. 1 and 6) engageable in a diagonal cam slot 56 formed on a longitudinally movable bar 57 which is slidably mounted on the carriage 9 and the bed portion of the lathe. Similarly the front tool slide 19 is provided with a follower stud 58 engageable in a diagonal cam slot 59 formed on a bar 60 which bar is movable longitudinally of the lathe and slidably mounted on the carriage 11 and the bed. Thus during longitudinal movements of the cam bars the tool slides are moved transversely of the bed.

Preferably the cam bars 57, 60 are actuated by the supporting carriages 9 and 11 so that during the initial movements of these carriages prior to the movements of the head end carriages 8 and 10 the tool slides are advanced to move the tools 21 and 24 into positions corresponding to those of the tools 16 and 17. As illustrated herein, the cam bars are provided with rack teeth which mesh with pinions 61 and 62 respectively, mounted on stub shafts 63, 64 which are rotatably supported on the base portion of the lathe. These pinions are arranged to be actuated by means of rack bars 65, 66 (Fig. 1) secured respectively to the carriages 9 and 11. During movement of the carriages with the rack bars 65, 66 engaging the sides of the pinions 61, 62 opposite to the cam bars 57, 60 the cam bars move counter to the carriages through distances along the bed equal to those of the carriages. Thus relatively to the carriages, the cam bars move twice the distance of the carriage movement relatively to the bed. By moving the cam bars in this manner twice as fast as the carriages more practical cam slot formations may be used to obtain the desired lateral movements of the tools slides 18, 19. The cam slots 56, 59 have dwell portions 56ª, 59ª respectively so that when the tools have been advanced transversely of the lathe to the desired diameter they are held to that diameter during the cutting operation upon continued longitudinal movement of the carriages.

As mentioned hereinbefore, the invention in its preferred form contemplates that the finishing tools will be actuated so as to engage the work after the roughing operations have been completed. The cam formations shown in the drawings on the drums 50 are arranged to accomplish this timing. As illustrated the rollers 46, 47 are positioned along the line a—a of Fig. 5 in which position of the rollers the roughing tools are dwelling at the end of their feeding movement and the finishing tools are about to commence their feeding movement. The cam slots are preferably provided with rapid approach portions 48ª, 49ª, feed portions 48ᵇ, 49ᵇ, dwell portions 48ᶜ, 49ᶜ at the ends of the feed portions, rapid return portions 48ᵈ, 49ᵈ and dwell portions 48ᵉ, 49ᵉ at the ends of the rapid return portions. It will be readily apparent from Fig. 5 that the rear tools, actuated by the cam 48, will finish their rapid approach and feed movement prior to the completion of the approach of the front tools and that the front or finishing tools will continue feeding during a portion of the return strokes of the rear tools. When the rollers 46, 47 are positioned along the line c—c, the tools are all withdrawn from the work.

With the cam drums positioned so that the rollers 46, 47 are along the line a—a of Fig. 5, the rear carriages 8 and 9 are adjusted along the bed by manually rotating the nuts 30, 38 to position the roughing tools 16, 21 in their final cutting positions. During this adjustment of the nuts 30, 38 the interengaging portions 41 of the coupling members 40 on the rear feed screws 26, 34 are in engagement as during the feeding movement of the rear tools.

With the rear tools adjusted, the cam drums are preferably rotated until the rollers 46, 47 are positioned along the line b—b of Fig. 5 whereupon the adjusting nuts 31, 39 on the front carriages are operated manually to place the finishing tools 17, 24 in their final cutting positions. During this adjustment the interengaging lugs 41 of the coupling members 40 between the feed screws 27, 35 are in their forward driving abutting relation as during the feeding movement of the front tools.

It will be apparent from the foregoing that the invention provides a lathe especially adapted to rough and finish in one operation the opposite ends of work pieces which are difficult to rechuck. Furthermore by operating upon both ends of the work simultaneously the roughing tools leave equal amounts of metal for the finishing tools to remove on successive work pieces, and inasmuch as all operations are performed without rechucking, the turned bores are concentric and the faces are parallel to each other.

It will also be apparent that the invention provides a novel arrangement of tool supports and means for actuating the supports arranged to withdraw the tail end tools to permit the work to be removed from the lathe conveniently when it is mounted on a mandrel and embodies improved means for actuating the cross slides adapted to permit use of practically proportioned parts simple in construction. When used for operating on stators such as the one illustrated, wherein it is desired to finish bore the end plates concentrically with the rotor bore of the stator and to provide absolutely parallel faces on the end plates whereby to obtain accurate mountings for the bearing supporting end bells, the invention provides a machine of simple and rugged construction adapted to perform accurately, cutting operations upon a plurality of duplicate work pieces.

I claim as my invention:

1. A lathe having, in combination, a bed, a longitudinally movable carriage, a cross slide on said carriage, and means for advancing the cross slide to an operating position during the initial movement of the carriage comprising a bar having a cam slot therein slidable longitudinally on the carriage, a follower for said cam movable with the cross slide, a pinion rotatably mounted on the bed and meshing with rack teeth on said cam bar and a rack bar secured to the carriage and having its teeth in engagement with said pinion.

2. A lathe having, in combination, a bed, a longitudinally movable carriage, a tool slide thereon, and means for actuating said tool slide during a movement of the carriage comprising a shaft rotatably mounted on the bed, means supported on the carriage arranged to rotate said shaft during a movement of the carriage, and an operable connection between said shaft and the tool slide.

3. A lathe having, in combination, a bed, a carriage, a tool slide on said carriage, and means for actuating said tool slide comprising a shaft rotatably mounted on the bed, a rack bar secured to the carriage and engaging a pinion on said shaft, and a connection between said shaft and the tool slide.

4. A lathe having, in combination, a bed, a longitudinally movable carriage, a transversely movable tool slide, and means for actuating said tool slide operable by the carriage and comprising a rack bar secured to the carriage, a pinion engaging said rack bar rotatably mounted on the lathe bed, a cam bar slidably mounted on the bed having rack teeth engaging said pinion, and a roller on said tool slide operable by said bar to move the tool slide.

5. A lathe having, in combination, a bed, a pair of rear carriages, a pair of front carriages, tool slides on said carriages, a unitary drive mechanism for the carriages arranged to move the carriages of each pair towards and away from each other during an operating cycle, and means for actuating certain of the tool slides including rack bars secured to the carriages supporting said certain tool slides, pinions rotatably mounted on the bed, rack bars in engagement with the opposite sides of the pinions, cam slots on said last mentioned rack bars, and followers for the cam slots movable with the tool slides.

6. A lathe having, in combination, a pair of longitudinally movable front tool carriages, tool slides on said carriages, means for actuating said carriages towards and away from each other, and means for actuating one of the tool slides operable by the carriage supporting said slide to advance said slide during the first portion of the advancing stroke of its carriage and to retract said slide during the last portion of the retracting stroke of said carriage.

7. A lathe having, in combination, a pair of longitudinally movable tool carriages, a feed screw for one of the carriages, means for driving the feed screw in reverse directions, a feed screw for the other carriage in axial alinement with the first feed screw, and a lost motion driving connection therebetween.

8. A lathe having, in combination, a pair of longitudinally movable carriages, movable towards and away from each other, feed screws for said carriages, means connecting said feed screws permitting a limited relative movement therebetween, nuts mounted on the carriages in engagements with said screws, and means to rotate said nuts to adjust the relative positions of the carriages.

9. A lathe having, in combination, a bed, a pair of longitudinally movable front carriages, and means for actuating said carriages comprising feed screws for the respective carriages, and a lost motion connection therebetween.

10. A lathe having, in combination, a bed, longitudinally movable front and rear carriages, cross tool slides on said carriages, roughing tools on the rear cross slide, a finishing tool on the front cross slide, means for actuating the cross slides during movement of the respective carriages, and a unitary drive mechanism for the carriages arranged to actuate the rear carriage in advance of the front carriage.

11. A lathe having, in combination, means for rotatably supporting the work, a pair of rear tool slides carrying roughing tools, a pair of front tool slides carrying finishing tools, and means to actuate said tool slides so that each pair of tools shall operate simultaneously on opposite ends of the work piece and with the roughing tools in advance of the finishing tools.

12. A lathe having, in combination, a pair of rear carriages, a pair of front carriages, and a unitary drive mechanism for the carriages arranged to move the carriages of each pair towards and away from each other during an operating cycle.

13. A lathe having, in combination, a bed, a pair of longitudinally movable rear carriages, a pair of longitudinally movable front carriages, feed screws for said rear carriages driven one by the other, feed screws for the front carriages driven one by the other, and means for actuating said feed screws comprising a driven shaft extending transversely of the lathe bed, cam drums on said shaft, a pair of rack bars slidable transversely of the bed arranged to be actuated by the said cam drums, and means connecting said rack bars respectively with front and rear feed screws.

14. A lathe having, in combination, a bed, means for rotatably supporting a work piece on which it is desired to perform rough facing and boring operations on the opposite ends and finishing operations on the opposite ends, a rear tool slide carrying roughing tools movable longitudinally between the work and the headstock, a front tool slide carrying a finishing tool movable longitudinally between the work and the headstock, a rear tool slide carrying roughing tools for the tail end of the work, a front tool slide carrying a finishing tool for the tail end of the work, means to move said tool slides towards and away from the work piece, and means to advance and withdraw the tail end cross slides transversely of the bed.

15. A lathe having, in combination, a bed, means for rotatably supporting a work piece, longitudinally movable carriages carrying tools arranged to operate on the opposite ends of the work, a tool supporting slide on one of said carriages movable transversely of the lathe, a unitary drive mechanism for advancing and returning the carriages, and means to advance and retract said tool slide during the initial and final portions respectively of the advance and return movements of the carriage supporting said slide.

16. A lathe having, in combination, means for rotatably supporting a work piece, longitudinally movable front and rear carriages, tool supporting cross slides on said carriages, a unitary drive mechanism for advancing and returning the carriages, and means for advancing and retracting the cross slides during portions of the advance and return movements of the carriages.

17. A lathe having, in combination, a bed, means for rotatably supporting a work piece, pairs of front and rear carriages carrying tools arranged to operate on the opposite ends of the work, tool supporting slides on the carriages movable transversely of the carriages, a unitary drive mechanism for the carriages, and means operable by the respective carriages supporting said tool slides to advance and retract certain of said tool slides to and from their cutting positions during the advance and return movements of the respective carriages.

18. A lathe having, in combination, means for rotatably supporting a work piece, longitudinally movable front and rear carriages, tool supporting cross slides on said carriages, a unitary drive mechanism for the carriages, and means operable by the carriages for advancing and retracting the cross slides during portions of the advance and return movements of the carriages.

19. A lathe having, in combination, a bed, a rotatably mounted expanding mandrel for mounting work pieces upon which it is desired to perform cutting operations on the opposite ends, longitudinally movable front and rear carriages carrying tools arranged to engage opposite ends of the work and a unitary drive mechanism for advancing and returning said carriages.

In testimony whereof, I have hereunto affixed my signature.

ERNEST J. SVENSON.